(12) United States Patent
Moreaux et al.

(10) Patent No.: US 8,028,149 B2
(45) Date of Patent: Sep. 27, 2011

(54) METHOD OF READING THE MEMORY PLANE OF A CONTACTLESS TAG

(75) Inventors: Christophe Moreaux, Simiane (FR); Pierre Rizzo, Aix en Provence (FR)

(73) Assignee: STMicroelectronics SA, Montrouge (FR)

( * ) Notice: Subject to any disclaimer, the term of this patent is extended or adjusted under 35 U.S.C. 154(b) by 855 days.

(21) Appl. No.: 11/132,161

(22) Filed: May 18, 2005

(65) Prior Publication Data

US 2005/0270142 A1  Dec. 8, 2005

(30) Foreign Application Priority Data

May 18, 2004  (FR) ...................................... 04 05426

(51) Int. Cl.
*G06F 12/00* (2006.01)
*G06F 13/00* (2006.01)
*G06F 13/28* (2006.01)
*H04Q 5/22* (2006.01)

(52) U.S. Cl. ....... 711/219; 711/217; 711/218; 340/10.1; 340/10.51; 340/10.4

(58) Field of Classification Search .................... 711/219
See application file for complete search history.

(56) References Cited

U.S. PATENT DOCUMENTS

| | | | | |
|---|---|---|---|---|
| 6,631,848 B1* | 10/2003 | Gaultier | ........................ | 235/492 |
| 6,771,716 B1* | 8/2004 | Gaultier | ........................ | 375/340 |
| 7,040,532 B1* | 5/2006 | Taylor et al. | .................. | 235/375 |
| 2003/0028814 A1* | 2/2003 | Carta et al. | ..................... | 713/202 |
| 2003/0183699 A1* | 10/2003 | Masui | .......................... | 235/492 |
| 2004/0196143 A1* | 10/2004 | Crump et al. | ................. | 340/10.1 |
| 2005/0029353 A1* | 2/2005 | Isemura et al. | ............... | 235/454 |

FOREIGN PATENT DOCUMENTS

EP  1 001 360 A1  5/2000

OTHER PUBLICATIONS

"International Standard ISO/IEC 15693-3 Identification Cards—Contactless Integrated Circuit(s) Cards—Vicinity Cars, Part 3: Anti-collision and Transmission Protocol", Apr. 1, 2001, pp. 1-49.

* cited by examiner

*Primary Examiner* — Brian Peugh
*Assistant Examiner* — Prasith Thammavong

(57) ABSTRACT

A method of reading a group of memory words from an integrated circuit memory of a contactless tag, comprising the sending by a remote interrogation unit to the contactless tag of a specific command for reading the group of memory words from a given start address, the initialization of an address counter for the contactless tag to the value of the given start address, and the sending by the contactless tag of the memory word at the start address, as well as an iterative process comprising in succession a first step of sending by the remote interrogation unit to the contactless tag of an incrementation marker recognizable by the contactless tag, a second step of incrementation of the address counter for the contactless tag in response to the incrementation marker, and a third step of sending by the contactless tag to the remote interrogation unit of a data frame comprising the memory word stored in the memory at the address pointed at by the current value of the address counter.

22 Claims, 3 Drawing Sheets

METHOD OF READING THE MEMORY PLANE OF A CONTACTLESS TAG

TECHNICAL FIELD OF THE INVENTION

The present invention relates in a general manner to the reading of data from a memory of a contactless tag of RFID type (standing for "Radio Frequency Identification"). More particularly, it proposes a command allowing accelerated reading, total or partial, of the content of the memory.

BACKGROUND OF THE INVENTION

RFID tags, or contactless tags, are being used ever more in everyday life, in particular for the traceability of a range of products, or of products individually. An exemplary RFID tag is presented in FIG. 1. With no energy source of its own, it comprises an antenna 2 and an electronic circuit 3 including a memory in which may be stored various items of information specific to the use of the tag, for example an identification code or (identifier) identifying the tag in particular. An RFID tag is a transmitter/receiver remotely energized by a radio field produced by a remote interrogation unit 4. The tag sends the information stored in part or totally, in response to an interrogation message contained in a radio signal 20 received from the interrogation unit 4. The exchanges are carried out in the form of frames containing bit sequences.

The memory serving to store the identifier of the tag may be a memory, for example, of OTP type (standing for "One Time Programmable") or of EEPROM type (standing for "Electrically Erasable Programmable Read Only Memory"). Nowadays it may have sizes greater than 64 bits, or even reach sizes of a few tens of kilobits (for example 64 kbits).

Such a memory is typically organized into memory words, also called blocks, the whole set of these words forming the memory plane. A memory word consists of a certain number of adjacent memory cells, each storing one bit, and placed on one and the same row of the memory plane. Each block is identifiable by its position, called the address, in the memory plane.

A memory may moreover be organized into several memory areas, each grouping together one or more blocks. A first area is reserved for storing the identifier of the tag, and is called the UID area ("User Identification"). One or more other memory areas may be present also, and are then available for another use to be defined by the user. Such a memory area is called a USER area. As in the USER area, each of the blocks in the UID area is distinguishable by its address in the memory.

Commands for access to the whole or to a part of the memory plane (called a "memory dump"), on the basis of the address of a determined memory word are known from the standard in force ISO/IEC FCD 15693, like the "read multi block" optional command whose parameters include the reading start address, and the number of blocks to be read.

According to the ISO/IEC 13239 standard in force, the contactless tag accompanies each block or group of blocks transmitted in a frame by a Cyclic Redundancy Check code or CRC, which is dependent on the data of the block or blocks transmitted in the frame, and coded on 16 bits. The role of the CRC is to enable the remote interrogation unit to verify whether there has not been any transmission error in respect of the frame. The remote interrogation unit actually verifies whether the value of the block or blocks received is correct, that is to say complies with the value of the CRC received. If not, the remote interrogation unit ignores the frame received, which may have to be sent again.

The same holds in respect of the "read multi block" command which brings about the transmission of a certain number of blocks of the memory plane in a single frame, and protected by a single CRC. Now, the larger the size of the memory plane, the larger the risk of transmission error.

Should there be a transmission error with regard to the frame, it is the entire frame that has to be retransmitted. It follows that the "read multi block" command is not adapted to the reading of a memory plane of large size.

A protocol for sequential reading by successive commands for reading a memory word, on the basis of the address of a determined memory word, is also known, and is represented diagrammatically in FIG. 2a. However, it requires the sending 60 by the remote interrogation unit of a block read command (COM_ADDRES) after each receipt 61 of a block sent by the contactless tag. Having regard to the memory sizes envisaged today for contactless tags, this sequential reading (blockwise) may give rise to a very long time for reading the entire memory plane. Specifically, for a contactless tag comprising a memory composed of 2048 blocks, each of 32 bits (i.e. 64 kbits in total) and communicating according to the ISO/IEC 15693 protocol, the maximum speed of transfer when sending and receiving is 26.48 kbit/s.

The reading of the memory plane then comprises the following steps, with their respective duration calculated on the basis of the maximum speed of transfer mentioned above:
1. Sending by the remote interrogation unit of the command to read a block COM_ADDRES (coded on 116 bits according to the standard) 4.4 ms
2. Standby time waiting for the response from the contactless tag 0.3 ms
3. Sending by the contactless tag of a block and of the corresponding CRC (coded on 56 bits according to the standard, including 16 for the CRC) 2.1 ms
4. Standby time waiting for the sending by the remote interrogation unit of a new read command 0.3 ms This sequence of steps is repeated 2048 times for the reading of the whole of the memory plane, this giving a total reading time of 14.5 seconds. It is in particular the systematic sending of a command to read a block COM_ADDRES that is time-consuming. The durations are given by way of indication and are calculated on the basis of the maximum speed of transfer according to the ISO/IEC 15693 standard. Other speeds are possible, in particular according to the ISO/IEC 14443 standard, such as speeds of 106 kbits/s, of 212 kbits/s or 424 kbits/s. In the subsequent account, the maximum speed of 26.48 kbits/s according to the ISO/IEC 15693 standard will be retained for all the durations mentioned.

SUMMARY OF THE INVENTION

To address the above-discussed deficiencies of the prior art, an object of the present invention is to propose a reading protocol for accelerating the total or partial reading of the memory plane (or memory dump) without increasing the transmission risk.

To this end, the invention proposes a method of reading a group of memory words from an integrated circuit memory of a contactless tag, comprising the sending by a remote interrogation unit to the contactless tag of a specific command for reading the group of memory words from a given start address, the initialization of an address counter for the contactless tag to the value of the start address, and the sending by the contactless tag of the memory word at the start address, as well as an iterative process comprising in succession the following steps:

sending by the remote interrogation unit to the contactless tag of an incrementation marker recognizable by the contactless tag, incrementation of the address counter for the contactless tag in response to the incrementation marker, and sending by the contactless tag to the remote interrogation unit of a data frame comprising the memory word stored in the memory at the address pointed at by the current value of the address counter.

Thus the read command is sent only once, and is replaced for the reading of the following memory words by the sending of an incrementation marker. Such a marker can in practice be limited to a reduced number of bits, for example four. Its transmission at 26.48 kbits/s lasts around 0.15 ms, this being substantially less than the duration of transmission of a block read message. Nevertheless, the reading protocol remains a blockwise reading protocol, thus limiting the size of the transmissions, and hence the attached risks of transmission error.

In another advantageous embodiment, the data frame sent by the contactless tag to the remote interrogation unit comprises a cyclic redundancy check code which is dependent on the memory word.

In an advantageous embodiment, the remote interrogation unit is adapted to verify the integrity of the memory word received from the contactless tag with the aid of the check code and to send an incrementation marker in the case of integrity, or to send a transmission error marker recognizable by the contactless tag and distinct from the incrementation marker in the converse case. This enables the contactless tag, by virtue of a protocol provided for the purpose, to retransmit the memory word which was not correctly received by the interrogation unit.

Furthermore, the address counter for the contactless tag is not incremented when the contactless tag recognizes the transmission error marker sent by the remote interrogation unit. Thus, the address counter remains blocked at the current address of the last memory word sent, and the latter will have to be transmitted again during the next iteration.

Advantageously, the iterative process is terminated when the remote interrogation unit sends a frame distinct from the incrementation marker and from the transmission error marker or when the current value of the address counter points at a value greater than the last address of the group of memory words.

In a preferred embodiment, the incrementation marker is an end of frame delimiter field.

Thus use is made of a field known from the ISO/IEC 15693 standard to allow the incrementation of the current value of the address counter. This is advantageous since the tags of known type already comprise the circuitry necessary for decoding such binary patterns.

The invention also relates to a contactless tag comprising a memory addressable via an address counter which is initialized to a given start value on receipt of a specific read command and which is incremented on receipt of an incrementation marker received from a remote interrogation unit.

Before undertaking the DETAILED DESCRIPTION OF THE INVENTION below, it may be advantageous to set forth definitions of certain words and phrases used throughout this patent document: the terms "include" and "comprise," as well a derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Other characteristics and advantages of the invention will become further apparent on reading the description which follows. The latter is purely illustrative and should be read in conjunction with the appended drawings in which like reference numerals represent like parts, and in which.

DETAILED DESCRIPTION OF THE INVENTION

Figure 1:
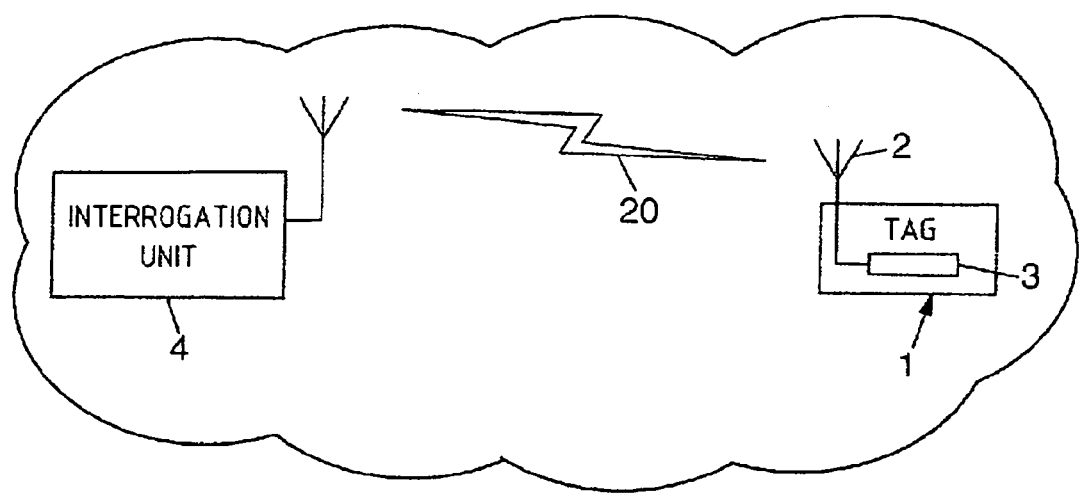
FIG. 1 is a diagram illustrating the principle of remote energizing of a tag.

FIG. 1 has already formed the subject of a description in the above introduction. FIGS. 2b through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged memory of a contactless tag of RFID type.

In a general manner, the commands, also called requests, sent by the remote interrogation unit, or the responses transmitted by the contactless tag, are coded and sent in the form of frames of a certain number of bits. The frames for the transmission of commands of a block, for example, are standardized according to the ISO/IEC 15693 standard. The frame structure is of the type:

| SOF | flags | OP Code | identifier | address | CRC | EOF |
| --- | --- | --- | --- | --- | --- | --- | where:

"SOF" is a start of frame delimiter field which marks the start of a frame corresponding to a command ("Start of File", size 8 bits), "flags" designates the actions to be fulfilled by the tag (size 8 bits), "OP Code" designates the code of the command ("OPeration Code", size 8 bits), "identifier" is the identifier stored in the UID area of the memory (size 64 bits), "address" is the address of the memory word in the memory (size 16 bits), "CRC" is a cyclic redundancy check code (size 16 bits), "EOF" marks the end of the sequence corresponding to the command (End of File, of size 4 bits).

The identifier is optional, and assumes that there has been a first communication between the remote interrogation unit and the contactless tag. With the identifier, the sequence of a command corresponds to 116 bits. In the subsequent account, it will be considered that it is used systematically so as to take account of the maximum duration of the sending of the read command.

In the ISO/IEC 15693 standard, the data are coded on the basis of a modulation of the position of pulses according to the 1 out of 4 mode. The bits are grouped together in twos, and represented by a pulse of 2×9.44☐s, occupying a position that differs as a function of the pair of bits coded (00, 01, 10, or 11) over a total time interval of 75.52 µs.

Figure 2A:
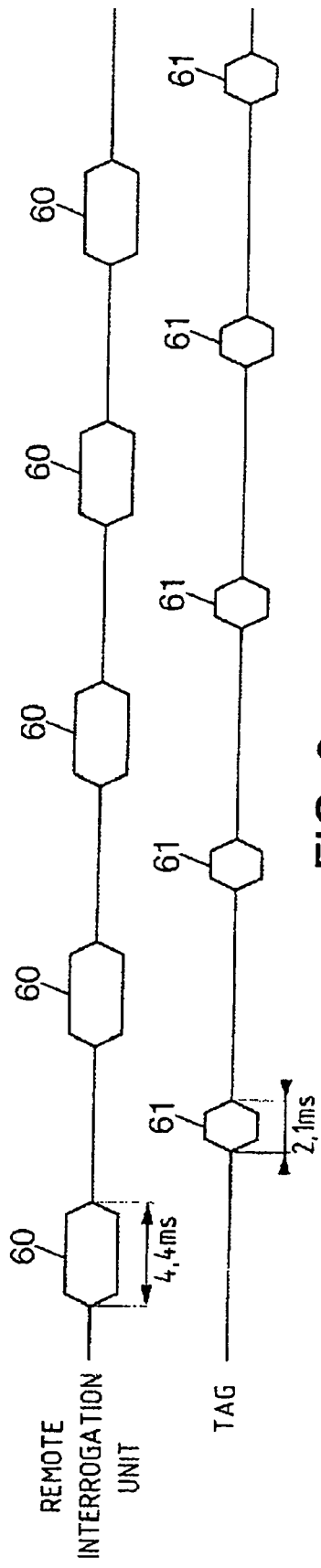
FIG. 2a is a diagram illustrating a known protocol for sequential reading of the memory plane.
Figure 2B:
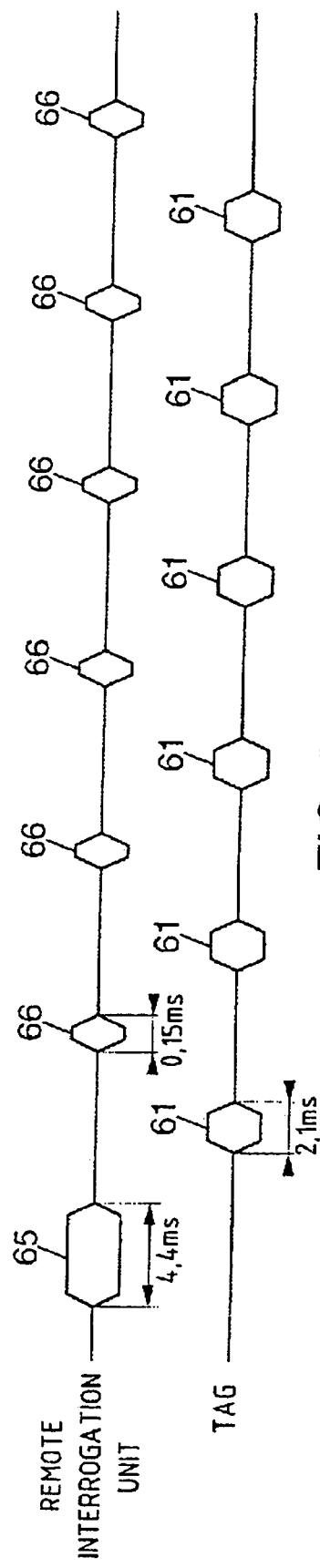
FIG. 2b is a diagram illustrating the principle of the method of reading according to the invention.

The reading protocol for accelerating the total or partial reading of the memory plane according to the invention, represented diagrammatically in FIG. 2b, is innovative in that the sending of a specific read command 65 is followed by the sending by the remote interrogation unit of an incrementation marker 66 recognizable by the tag, which marker brings about the sending by the contactless tag of the block 61 contained at the next address. It is not therefore necessary to send a command to read a block for the successive reading of each block, this requiring a considerable time having regard to the length of the frame coding it (116 bits).

Thus the reading protocol is an iterative sequential process, comprising the following steps, with their respective duration calculated on the basis of the minimum transfer speed:

| | |
|---|---|
| 1. Sending by the remote interrogation unit of a specific command to read a group of blocks starting from a given address ADDRESS_START | 4.4 ms |
| 2. Standby time during which an address counter for the contactless tag is initialized to the value of the said given address ADDRESS_START | 0.3 ms |
| 3. Sending by the contactless tag of a response frame comprising a block and a corresponding CRC | 2.1 ms |
| 4. Standby time | 0.3 ms |
| 5. Sending by the remote interrogation unit of an incrementation marker MARK_INCR. | 0.15 ms |

The fifth step then being followed by a return to the second step in the course of which the initialization of the address counter is replaced with an incrementation of this same counter.

The first step is the transmission by the remote interrogation unit of the specific read command, which allows the implementation of the transfer protocol by the tag. The standard provides for a certain number of typical commands, and offers manufacturers the possibility of defining other commands, by way of an available operator code (of the type "Ai", reserved for the manufacturer). The reading protocol according to the invention can therefore be implemented by way of a specific command, called COM_SPEC in the subsequent account, and chosen from among the commands reserved for the manufacturer.

The specific read command COM_SPEC as well as the command to read a block COM_ADDRES are coded in the same manner on 116 bits and therefore require the same transmission time. The command COM_SPEC is used only once in the protocol according to the invention.

Steps 2 to 4 are comparable to that of the known sequential reading protocol which was described in the introduction. However, step 2, which corresponds to the time required by the contactless tag to decode the command received and to access the block of the memory corresponding to the given address, comprises an additional step with respect to the known protocol and which consists in initializing an address counter COMPT to the value of the address ADDRESS_START contained in the specific command COM_SPEC. The standby time corresponding to this second step is identical to that of the same step of the known sequential reading protocol. This standby time is provided so as to allow the turnaround of the means of transmission/reception of the tag and of the remote interrogation unit. The given address ADDRESS_START is a parameter of the specific read command sent by the remote interrogation unit.

During the third step, the contactless tag sends the remote interrogation unit a frame containing the memory word stored at the address pointed at by the current value of the address counter COMPT, hence initially at the value ADDRESS_START. The frame transmitted also comprises a cyclic redundancy check code (CRC). This CRC is dependent, as explained in the introduction, on the value of the bits of the memory word transmitted. In contradistinction to the known "multi read block" command (according to which a certain number of memory words of the memory plane are transmitted in full in one and the same frame), the bit frame transmitted here remains a short frame, this limiting the risk of transmission error. The response time of the contactless tag in this third step is identical to that of the same step of the known sequential reading protocol.

During the fourth step, the remote interrogation unit takes account of the content of the transmission of the contactless tag, and undertakes in particular the verification of the CRC received with the block. For this purpose, the remote interrogation unit is adapted to verify whether the check code and the block sent by the contactless tag correspond.

During the fifth step, the remote interrogation unit sends an incrementation marker MARK_INCR recognizable by the contactless tag. In a preferred embodiment, the remote interrogation unit is adapted to verify the integrity of the block received from the contactless tag in the previous step, with the aid of the CRC. The result of this verification conditions the sending of the marker. Specifically, if the verification turns out to be positive, that is to say if there has been no transmission error in the third step, the incrementation marker recognizable by the tag MARK_INCR is sent by the remote interrogation unit and allows the incrementation of the address counter in such a way that it points to the address of the next block in the memory plane. In the converse case, the remote interrogation unit sends a transmission error marker MARK_ERROR, distinct from the incrementation marker, and which does not permit the incrementation of the address counter. Thus blocked at the current value, the same block may be transmitted again during a subsequent iteration.

In a preferred embodiment, the incrementation marker MARK_INCR is coded on 4 bits, and is for example an End of Frame delimiter field. This field is of small size. The coding or decoding logic is already available since this field is systematically used during the transmission or the sending of a command frame according to the standard. The duration of the transmission of an end of frame delimiter field is 0.15 ms for the minimum speed of 26.48 kbits/s. The transmission error marker MARK_ERROR is advantageously coded on 4 bits, with a coding distinct from that of the end of frame delimiter field.

Subsequent to the fifth step, if the reading of the memory plane has not terminated, the reading protocol resumes at the second step. This new second step differs from the second step of the protocol according to the invention described previously, the initialization of the address counter being replaced with an incrementation of the latter. The contactless tag is in fact adapted so that, during a first pass through the second step of the iterative process, the address counter is initialized to the value of the given address ADDRESS_START, and so that during all the other successive passes, the address counter is incremented if the remote interrogation unit has sent the incrementation marker, or retains its current value, if the remote interrogation unit has sent the transmission error marker. In all cases in point, the duration of this second step is 0.3 ms.

In the standard taken as an example (ISO/IEC 15693), there is a concept of error code CODE_ERR, that the contactless tag sends if for example the remote interrogation unit sends a command to read a block with an address outside the memory plane. In the reading protocol according to the invention, this case in point arises when the remote interrogation unit sends the incrementation marker subsequent to the successful sending of the last block by the contactless tag. Specifically, when the last block of the memory plane is sent by the tag, the current value of the counter then points to the last address of the memory plane. The sending of the incrementation frame by the remote interrogation unit, after positive verification of the integrity of the last frame received, brings about a new incrementation of the address counter which then points to an address value outside the memory plane. The tag then sends the CODE_ERR code. The remote interrogation unit is then adapted to stop the sending of the incrementation frames after receiving the CODE_ERR code. In another embodiment, it is possible to envisage the iterative process being terminated when the remote interrogation unit transmits a frame different from the incrementation marker or from the transmission error marker. This is the case in particular when the unit transmits a new read or write command. The transfer protocol is then terminated.

For a use of the transfer protocol according to the invention on the entirety of the memory plane of a memory of 2048 blocks, as for the previous example, it is then necessary to count a total transfer time of 5.8 seconds, i.e. about 2.5 times faster than with the known sequential reading protocol.

Figure 4:
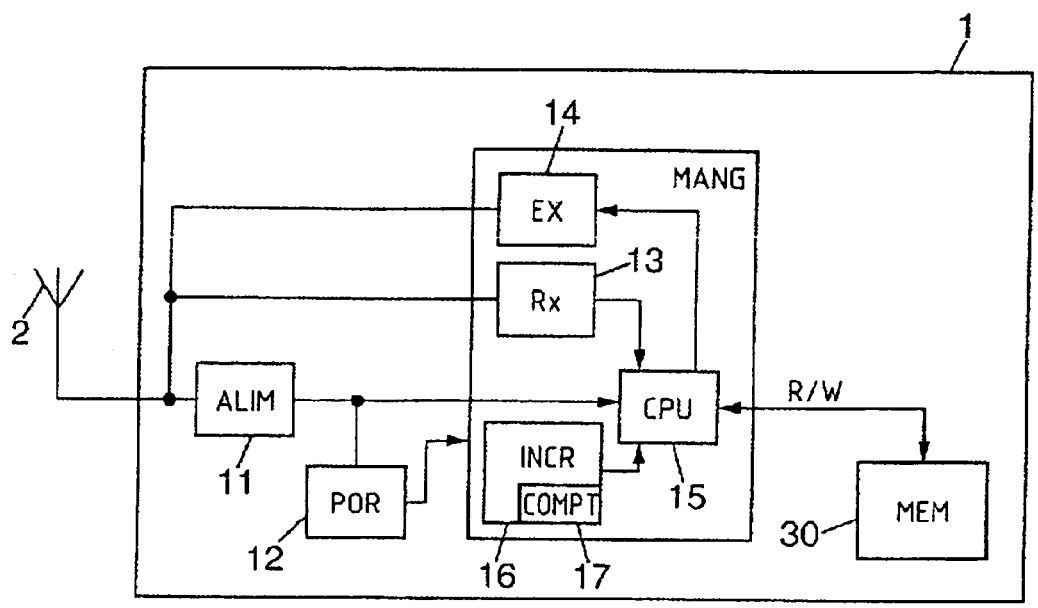
Figure 3:
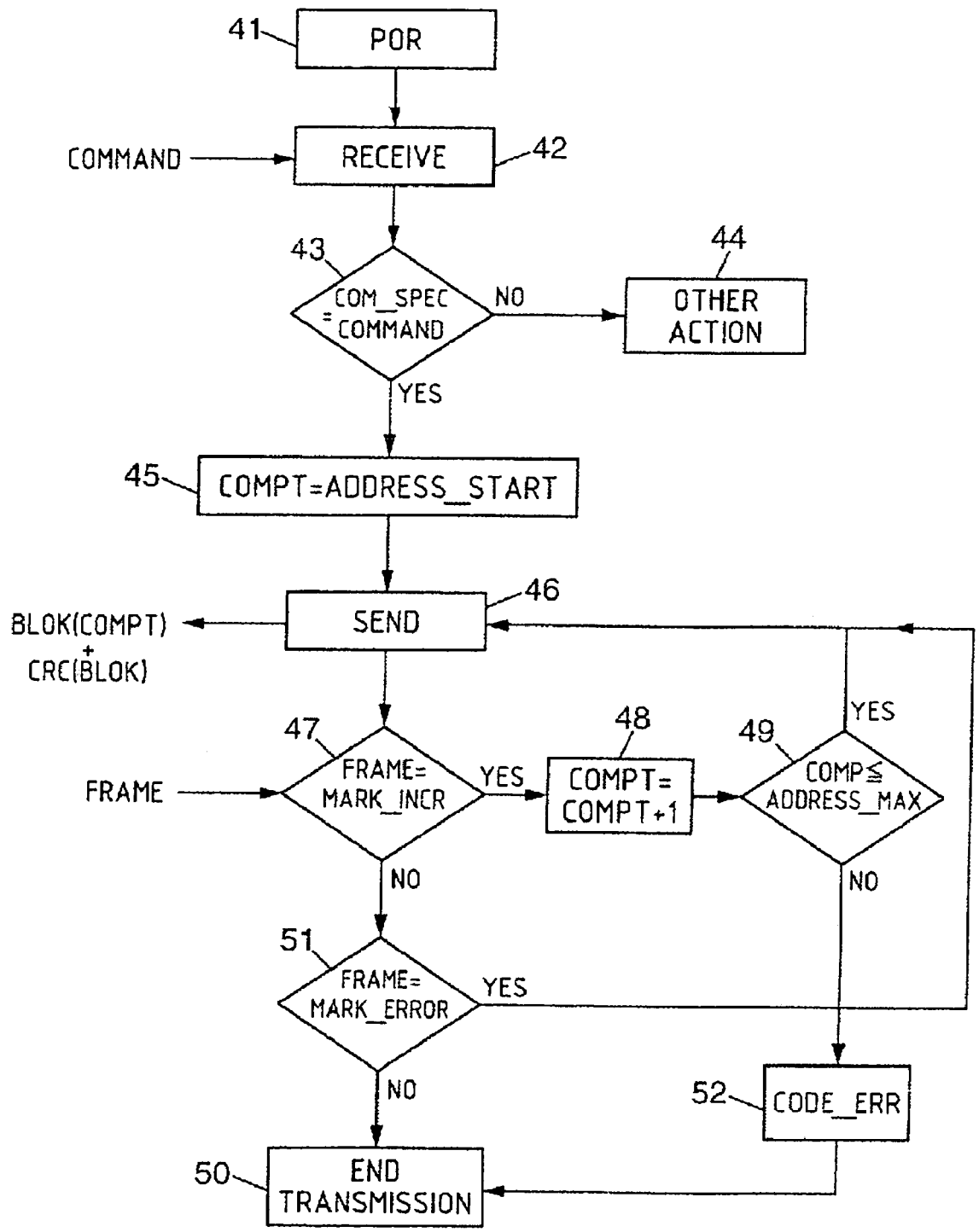
FIG. 3 is a chart of steps of a mode of implementation of the method according to the invention; and, FIG. 4 is a diagram of an exemplary embodiment of a contactless tag according to the invention.

FIG. 3 is a step chart illustrating an exemplary implementation of the reading protocol according to the invention. This protocol may be implemented in a MANG module managing the various modules of the contactless tag, as illustrated in FIG. 4 and described later. The tag, during its progressive entry into the radio field of the interrogation unit, must firstly be energized sufficiently by remote energizing before the execution of any operation is permitted. The check 41 of this condition is carried out by the POR device (standing for "Power On Reset") of FIG. 3, disposed upstream of the electronic circuit of the tag. Such a device is active as long as the energizing of the tag is not sufficient to ensure that all the components of the tag operate.

In a step 42, implemented for example as soon as the POR device becomes inactive, that is to say once the supply voltage level is sufficient, the tag receives a bit frame sent by the remote interrogation unit, and corresponding to a command accompanied by various parameters. During a step 43, the management module MANG verifies whether the command received is the specific command COM_SPEC allowing the transfer of the memory words from the memory plane starting from a given address ADDRESS_START, transmitted as parameter of the said specific command. If not, the management module undertakes another action, corresponding to the command received, during a step 44.

If the command received is the command COM_SPEC, the management module extracts the given address ADDRESS_START coded in the frame sent by the remote interrogation unit and during a step 45 initializes an address counter COMPT with this value ADDRESS_START. During a next step 46, the contactless tag sends by way of the send module a frame containing in particular the block corresponding to the current value of the incrementation marker, as well as the cyclic redundancy check code CRC which is dependent on the content of this block.

After a standby time corresponding to the receipt by the remote interrogation unit and in particular the verification of the transmission by way of the CRC, the tag receives a bit frame sent by the remote interrogation unit. Several cases in point may then arise. During a step 47, the management module verifies whether the frame received FRAME corresponds to the incrementation marker MARK_INCR, for example an end of frame delimiter field (EOF). If so, it increments the value of the address counter COMPT by one unit in step 48. If the last block sent was not the last block of the memory plane, this being verified for example during a step 49 by verifying whether the new current value of the address counter still lies in the memory plane (COMPT≦ADDRESS_MAX, the maximum value of the addresses of the memory plane), step 49 is followed by a return to step 46 to transmit the block contained in the memory plane at the address corresponding to the new current value of the address counter. If the new current value of the counter is greater than the maximum value ADDRESS_MAX, the contactless tag sends an error code CODE_ERR as seen previously, and the remote interrogation unit ends the reading protocol according to the invention during a step 50.

During a step 51, the management module verifies whether the frame received corresponds to the transmission error marker MARK_ERROR, sent by the remote interrogation unit when a transmission error has arisen (that is to say when the block and the CRC received do not correspond). If so, the last block sent must be sent again, and the management module returns to the transmission step 46 with an unchanged value of the incrementation counter.

If the frame received FRAME is different from the incrementation marker or from the transmission error marker, and contains for example a new command sent by the remote interrogation unit, the management module ends the sequential reading during step 50.

FIG. 4 shows an exemplary electronic circuit contained in the contactless tag 1. The electronic circuit 3 of FIG. 1 is coupled to the antenna 2 for the reception of the radio signal 20 originating from the interrogation unit, and possibly comprising an interrogation signal for example. A power supply module 11 is intended for the extraction of the DC supply voltage of the circuit from the radio signal. A neutralization device 12, or POR device (standing for "Power on Reset") makes it possible to maintain the electronic circuit in the inactive state (not powered) as long as the supply voltage has not reached a threshold level sufficient to ensure the entirety of the functions of the electronic circuit. A reception module 13 has the job of extracting an interrogation message or any other command from the radio signal when the interrogation unit sends a bit frame. The job of sending a response message of the tag to an interrogation message is that of a send module 14. A processor or more simply a hard-wired logic checking circuit 15 fulfils the function of central processing unit (CPU) of the tag and manages in particular the memory 30 in write and read mode. An additional incrementation module 16 (INCR) allows the steps of initializing and incrementing an address counter 17 (COMPT). This module may be included in the CPU processor or be separate. It is adapted for incrementing the address counter in response to the incrementation marker (previous block transmitted without error), or to retain the current value of the address counter, when the transmission error marker is received (transmission error with regard to the previous block).

The modules 13 and 14, the incrementation module 16, and the circuit 15 form the management module MANG mentioned previously.

In a general manner, the management module MANG manages the read/write operations for the memory 30 of the tag 1. It is also adapted for implementing the reading protocol according to the invention when the specific read command COM_SPEC is sent by the remote interrogation unit. The management module is in particular adapted so that the contactless tag sends the memory word contained at the address corresponding to the current value of the address counter, after the tag has received the incrementation marker or the transmission error marker. That is to say it is adapted so that the contactless tag sends the content of the block at the address pointed at by the current value of the address counter, without however the tag having received a command to read (COM_ADDRES, for example) the said block.

For this purpose, the memory 30 of the contactless tag is addressable via an address counter 17 which is initialized to a given start value on receipt of a specific read command and which is incremented on receipt of an incrementation marker received from a remote interrogation unit. The tag is moreover devised so as to send the remote interrogation unit the memory word stored in the memory at the address pointed at by the current value of the address counter in a data frame furthermore comprising a cyclic redundancy check code (CRC) which is dependent on the memory word.

Moreover, the management module MANG is adapted so that the incrementation marker is not incremented on receipt of a transmission error marker, distinct from the incrementation marker, which is sent instead of the incrementation marker by the remote interrogation unit when the remote interrogation unit notes with the aid of the check code an error of transmission of the memory word sent by the contactless tag. It is intended that the present invention encompass such changes and modifications as fall within the scope of the appended claims.

What is claimed is:

1. A method of reading an integrated circuit memory of a contactless tag, comprising:
    receiving, from a remote interrogation unit at the contactless tag, a specific command to read a group of memory words from a given start address;
    initializing an address counter for the contactless tag to a value of the start address;
    sending, by the contactless tag, an initial memory word within the group of memory words at the start address; and
    performing an iterative process comprising:
        receiving, from the remote interrogation unit at the contactless tag, a message consisting of an incrementation marker recognizable by the contactless tag in response to each memory word within the group of memory words at an address corresponding to a current value of the address counter being successfully sent by the contactless tag to the remote interrogation unit;
        in response to the incrementation marker, incrementing the address counter or the contactless tag from the current value to a new value; and
        sending, by the contactless tag to the remote interrogation unit, (a) a data frame comprising a memory word within the group of memory words stored in the memory at an address corresponding to the new value of the address counter and (b) a cyclic redundancy check code which is dependent on the memory word at the address corresponding to the new value of the address counter, wherein the new value becomes the current value for subsequent iterations.

2. The method of reading according to claim 1, further comprising:
    receiving, from the remote interrogation unit at the contactless tag, the incrementation marker if the remote interrogation unit verifies an integrity of the memory word corresponding to the new value of the address counter received from the contactless tag with the aid of the cyclic redundancy check code and a transmission error marker recognizable by the contactless tag and distinct from the incrementation marker if the remote interrogation unit could not verify the integrity of the memory word corresponding to the new value of the address counter.

3. The method of reading according to claim 2, in which the address counter for the contactless tag is not incremented in response to the transmission error marker.

4. The method of reading according to claim 3, in which the iterative process is terminated when the remote interrogation unit sends a frame distinct from the incrementation marker and from the transmission error marker or when the current value of the address counter corresponds to a value greater than a last address of the group of memory words.

5. The method of reading according to claim 4, in which the incrementation marker is an end of frame delimiter field.

6. The method of reading according to claim 5, in which the given start address is a parameter of the specific command sent by the remote interrogation unit.

7. The method of claim 1, wherein the data frame comprises a start of frame delimiter field and an end of frame delimiter field.

8. The method of claim 1, wherein a determination of whether the memory word is successfully sent is based on a review of the cyclic redundancy check code.

9. A contactless tag comprising a memory addressable via an address counter, the contactless tag configured to initialize the address counter to a given start value on receipt of a specific command and to increment the address counter on receipt of an incrementation marker from a remote interrogation unit, wherein the contactless tag is operable to send to the remote interrogation unit a memory word within a group of memory words stored in the memory at the address corresponding to a current value of the address counter, the memory word sent by the contactless tag in a data frame including a cyclic redundancy check code which is dependent on the memory word, and wherein the incrementation marker is received by the contactless tag from the remote interrogation unit after successfully sending the memory word at the address corresponding to the current value of the address counter.

10. The contactless tag according to claim 9, in which the incrementation marker is not incremented on receipt by the contactless tag of a transmission error marker, distinct from the incrementation marker, sent instead of the incrementation marker by the remote interrogation unit when the remote interrogation unit notes with the aid of the cyclic redundancy check code an error of transmission of the memory word sent by the contactless tag.

11. The contactless tag according to claim 10, in which the incrementation marker is an end of frame delimiter field.

12. The contactless tag of claim 9, wherein the contactless tag comprises an RFID tag.

13. The contactless tag of claim 9, wherein a determination of whether the memory word is successfully sent is based on a review of the cyclic redundancy check code.

14. A contactless tag, comprising:
a processor;
a memory connected to communicate with the processor;
an address counter accessible by the processor;
a reception module operable to receive radio-frequency communications; and
a send module for transmitting radio-frequency communications,
the contactless tag configured to:
receive a message consisting of an incrementation marker in response to a successfully sent memory word within a group of memory words,
modify the contents of the address counter according to the incrementation marker, and
transmit a data frame corresponding to the memory word within the group of memory words stored in the memory at an address corresponding to a current value of the address counter, the data frame including a cyclic redundancy check code which is dependent on the memory word, wherein receiving, modifying, and transmitting are repeated iteratively as long as successive incrementation markers are received.

15. The contactless tag of claim 14, wherein the incrementation marker is an end of frame delimiter field.

16. The contactless tag of claim 14, wherein the tag is further configured to receive a transmission error marker, and wherein the contents of the address counter are not modified in response to the transmission error marker.

17. The contactless tag of claim 14, wherein the tag is further configured to receive a transmission error marker, and to thereafter re-transmit the data frame corresponding to the memory word stored in the memory at an address corresponding to the current value of the address counter.

18. The contactless tag of claim 14, wherein the tag does not transmit a data frame corresponding to the memory word when the current value of the address counter points at a value greater than the last address of the group of memory words.

19. The contactless tag of claim 14, wherein the tag is an RFID tag.

20. The contactless tag of claim 14, wherein the tag communicates with an RFID reader.

21. The contactless tag of claim 14, further comprising a power module configured to generate a supply voltage.

22. The contactless tag of claim 14, further comprising a power-on-reset circuit.

* * * * *